United States Patent
Mobed et al.

(10) Patent No.: US 7,103,573 B2
(45) Date of Patent: Sep. 5, 2006

(54) USER REWARDS PROGRAM AND ASSOCIATED COMMUNICATIONS SYSTEM

(75) Inventors: Jeffrey N. Mobed, Woodstock, CT (US); Paul V. Oliver, Wayne, PA (US)

(73) Assignee: PrivilegeOne Networks, LLC, Vero Beach, FL (US)

( * ) Notice: Subject to any disclaimer, the term of this patent is extended or adjusted under 35 U.S.C. 154(b) by 678 days.

(21) Appl. No.: 10/114,696

(22) Filed: Apr. 2, 2002

(65) Prior Publication Data

US 2003/0182247 A1  Sep. 25, 2003

Related U.S. Application Data

(60) Provisional application No. 60/281,129, filed on Apr. 2, 2001.

(51) Int. Cl.
*G06Q 99/00* (2006.01)
*H04K 1/00* (2006.01)

(52) U.S. Cl. .............. 705/56; 705/1; 705/26; 364/401; 364/405; 380/277

(58) Field of Classification Search ............ 705/1, 705/52, 26; 354/405, 401; 380/277
See application file for complete search history.

(56) References Cited

U.S. PATENT DOCUMENTS

| | | | | |
|---|---|---|---|---|
| 5,826,241 | A * | 10/1998 | Stein et al. ............... | 705/26 |
| 6,014,645 | A * | 1/2000 | Cunningham ............. | 705/38 |
| 6,516,416 | B1 * | 2/2003 | Gregg et al. ............. | 713/201 |
| 6,591,249 | B1 * | 7/2003 | Zoka ....................... | 705/18 |
| 6,607,136 | B1 * | 8/2003 | Atsmon et al. ........... | 235/492 |
| 6,618,763 | B1 * | 9/2003 | Steinberg ................. | 709/246 |
| 6,671,808 | B1 * | 12/2003 | Abbott et al. ............ | 726/4 |
| 6,817,521 | B1 * | 11/2004 | Matada .................... | 235/380 |
| 6,922,720 | B1 * | 7/2005 | Cianciarulo et al. ..... | 709/217 |

FOREIGN PATENT DOCUMENTS

JP   2004280581   * 10/2004

OTHER PUBLICATIONS

HASPDocDeal triple protection for HTML Documents date and author unknown.*

* cited by examiner

*Primary Examiner*—James P. Trammell
*Assistant Examiner*—John M. Winter
(74) *Attorney, Agent, or Firm*—Reed Smith LLP

(57) ABSTRACT

A financial system in which an intermediary facilitates transactions between one or more credit card issuers and a plurality of different vendors which may be related by a common characteristic. The financial system of the present invention preferably includes a consumer credit card and a membership card, both including some type of rewards program. A customer applies for the credit card and membership card at a point-of-sale associated with a vendor that sponsors the credit card. The vendor uses a computer with a hardware or software identification system to securely transmit the application to the intermediary via a broad bandwidth communication medium, such as the Internet. The credit card issuer may use an instant on-line approval mechanism to instantly send a credit card number and initial spending limit to the customer via the vendor's computer. If the customer is not instantly or otherwise approved for the credit card, the intermediary may provide the customer with a branded membership card that carries no purchasing power, but which provides certain rewards at the vendor's location, preferably building customer loyalty to the vendor.

12 Claims, 4 Drawing Sheets

USER REWARDS PROGRAM AND ASSOCIATED COMMUNICATIONS SYSTEM

CLAIM OF PRIORITY

This application claims the benefit under 35 U.S.C. § 119(e) of the earlier filing date of U.S. Provisional Patent Application No. 60/281,129 which was filed on Apr. 2, 2001.

BACKGROUND OF THE INVENTION

1. Field of the Invention

The present invention relates to multi-party financial systems, and, more specifically, the present invention relates to credit card acquisition systems in which a single intermediary facilitates transactions between a plurality of vendors and one or more credit card issuers.

2. Description of the Background

With the advent of new communications schemes and the ever-increasing ability to manage large amounts of information from a centralized location, multi-party financial systems have seen exponential growth recently. Among these financial systems, credit card systems are among the most highly competitive, and among the most varied.

A credit card generally gives a consumer enhanced purchasing power without having to have funds in an account prior to use of the funds (as with, for example, a checking account). The consumer gains the ability to purchase goods before the money to pay for the goods is earned and/or without having to carry legal tender at the point of sale. The credit card issuer preferably receives the benefit of yearly fees and/or the interest payments received on the money loaned to the consumer for the purchase of goods.

Because of the large amount of consumer credit card debt, many companies fiercely compete to sign up new credit card users, and further compete to keep consumers "loyal" to their particular brand/type of credit card. Among other factors, one way in which credit card issuers garner and keep customer loyalty and retention is by providing so called "rewards programs" whereby the consumer receives some benefit returned to them in exchange for use of the credit card. For example, a credit card issuer may provide cashback savings on a small percentage of purchases. With credit cards that are specifically branded to a single company, for example an airline, the sponsoring company often offers a more focused rewards program, such as frequent flyer miles given to the user for every dollar spent using the airline credit card.

A major problem with matching these credit card opportunities to the potential customers of the card is to determine a unique characteristic of the customer which may define a certain future spending habit. For example, the purchasers of a new car may be expected to purchase maintenance services and or automobile accessories at the dealership in which the car was purchased. Eventually, if the customer has a good experience with the automobile and the dealer, the customer may also be expected to purchase additional or replacement automobiles of the same brand and at the same dealership. This process enhances the potential revenue stream for the credit card issuer and the loyalty for the dealer.

In addition to locating the appropriate market for a particular credit card, the issuers may also be disadvantaged in that it is difficult to administer different credit card programs for different groups of users. The credit card issuer may provide various benefits, rates, or other attributes to users in different customer groups, and each of these groups must be kept administratively separate from each other. When a large variety of vendors all desire to have groups of their customers obtain a branded credit card from a certain credit card issuer, the bookkeeping difficulties are enormous.

As such, a need exists in the art to provide an intermediary between one or more credit card issuers and a plurality of disparate vendors offering a varied assortment of goods and/or services which are related in some way (i.e., brand, manufacturer, industry). The intermediary should be able to uniquely identify all of the groups of vendors from each other, as well as subgroups or individuals within each group, at the time when each transaction is commenced. It would also be desirable if the intermediary could receive and send data in disparate formats based on the needs and desires of the various vendors and credit card issuers. Finally, it is desirable to use the Internet, or other broad bandwidth electronic communications network, to facilitate the various communications across such a system.

These and other objects and advantages of the present invention will be readily recognized by one skilled in the art through the explanation given below, the attached figures and the claims appended hereto.

SUMMARY OF THE INVENTION

In accordance with at least on preferred embodiment, the present invention provides a financial system in which an intermediary facilitates transactions between one or more credit card issuers and a plurality of different vendors which may be related by a common characteristic. The financial system of the present invention preferably includes a consumer credit card and a membership card, both including some type of rewards program. Each vendor, and each location within each vendor is uniquely identifiable by the intermediary, and the intermediary provides a web-based portal site that facilitates information transfer between the vendors and the credit card issuers.

A customer applies for the credit card and membership card at a point-of-sale associated with a vendor that sponsors the credit card. The vendor uses a computer with a hardware or software identification system (such as a hardware HASP) to transmit the application to the intermediary over a broad bandwidth communication medium, such as the Internet. The intermediary both saves the application for future reference, and converts the data to a format acceptable to a credit card issuer and sends the application to the credit card issuer.

The credit card issuer may use an on-line approval mechanism to instantly send a credit card number and initial spending limit to the customer via the vendor's computer. The customer may use the credit card number in a "card not present" transaction for an interim period, and the credit card issuer will provide the physical credit card in a follow-up mailing.

If the customer is not instantly or otherwise approved for the credit card, the intermediary may provide the customer with a branded membership card that carries no purchasing power, but which provides certain rewards at the vendor's location, preferably building customer loyalty to the vendor.

Both the credit card and the membership card may be branded to the vendor, the intermediary, and/or the credit card issuer. The cards carry some type of rewards programs, such as building points for future purchases at the vendor's site or other reward. Because of the co- or tri-branding of the card, the burden of the redemption process of the rewards program may be shared between all of the participants in the financial system.

Generally speaking, the above process may be repeated with many different credit card issuers and vendors. A single intermediary preferably facilitates the unique identification of the vendor computer during each transaction, for example, to make sure that the credit card issuer sends the customer a card with the vendor's logo. The intermediary may also sponsor a business-to-business web site providing feedback and data mining about customers of each vendor.

The above multi-party system is especially useful for highly fractured industries wherein a few major goods producers use a wide variety of independent distributors. For example, the automobiles manufactured by only a few companies are sold through thousands of independent automobile dealers who compete with one another. The above system allows each local dealer to generate customer loyalty on the local level—separate from any loyalty to the automobile manufacturer itself.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION OF THE INVENTION

It is to be understood that the figures and descriptions of the present invention have been simplified to illustrate elements that are relevant for a clear understanding of the present invention, while eliminating, for purposes of clarity, other elements that may be well known. Those of ordinary skill in the art will recognize that other elements are desirable and/or required in order to implement the present invention. However, because such elements are well known in the art, and because they do not facilitate a better understanding of the present invention, a discussion of such elements is not provided herein. The detailed description will be provided herein below with reference to the attached drawings.

The present invention generally provides a customer retention membership card program and co-branded loyalty credit card program designed to expand and enhance a vendor's image within its trade area and to increase customer awareness, loyalty, retention, and revenue, through the issuance of vendor-specific membership cards and vendor-specific credit cards. Each card may be prominently branded with the individual vendor's name or logo on the face of the card (see, FIG. 4) and includes a customer loyalty value proposition intended to drive the customer back into the vendor's place of business for future and related goods and/or services. The loyalty value proposition may include, for example: a variable discount on goods and/or services when using the membership or credit cards; an instant seeding of money on either card when the customer first accepts the card; a best-in-class rewards program that allows a customer to earn rebate dollars good for future goods and/or services; or preferred service appointments.

The co-branded credit card allows a vendor to put the vendor logo on the card, and the intermediary is able to provide the credit card issuer with that information which is necessary to be provided back to the credit card issuer's fulfillment provider (for example, FLEET's First Data Resources). The information transfer from the one or more vendors to the one or more banks is sent through an intermediary sponsored portal web site. The issuer's fulfillment provider does the back-end processing for the credit card issuer. The intermediary identifies the vendor via a logo ID that it passes on to the credit card issuer. The intermediary provides the ability to actually separate thousands of vendors and keep their information separately organized.

Figure 1:
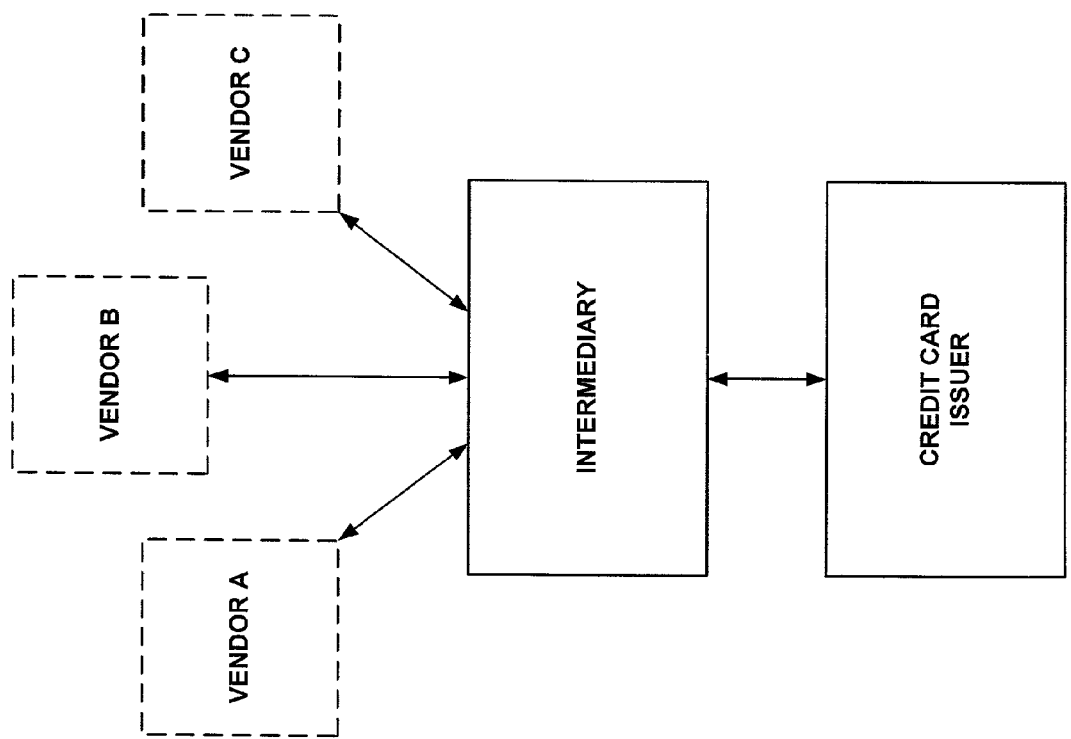
FIG. 1 shows a high level block diagram of the present invention.

As generally depicted in FIG. 1, rather than being limited to just one vendor and just one credit card issuer, the present invention preferably utilizes an intermediary who acts as a communications and functional bridge between a plurality of different vendors and one or more credit card issuers. In this way, the intermediary can transparently manage the accounts of many different vendors in disparate industries while taking advantage of economies of scale.

Because many different vendors can be managed by the intermediary, the present invention provides a vendor-specific, rather than manufacturing company-specific loyalty program. For example, in the automotive industry, rather than having a credit card branded with the name of an auto manufacturer (which does not encourage the individual dealers to promote the card), the customer would have a dealer-specific card, which the dealer would obviously promote strongly. This is especially important in that it is the dealer's branding (name and logo) rather than the automotive manufacturing company that is being promoted.

Although not limited thereto, one potential application of the present invention would be to the dealership structure of the automobile selling industry. This example will therefore run throughout the present document for purposes of example. In the automotive industry, although a few large automotive manufacturing companies brand the specific lines of their manufactured automobiles, each dealer competes against all other dealers (including other dealers that sell automobiles from the same manufacturer) for market share. The credit card and membership card according to the present invention may be tri-branded between this dealership, a credit card issuer, and an intermediary who administers the relationship between these two entities. This arrangement allows the dealer group the opportunity to have its own readily identifiable (branded) credit card.

The credit card is offered to the customer by the vendor's employees. For example, in a new automobile dealership, a credit card and a non-credit card membership card program would be offered to the dealership's customers when the customer purchases, leases, or services a new or used vehicle or by virtue of having previously purchased, leased, or serviced a new or used vehicle in or from that specific dealership. The credit card may be used by the consumer for after-market purchases at the point of sale or service and general credit card purchases. Consumers that do not qualify for the credit card may then be automatically enrolled into the intermediary's membership plan by the vendor.

In addition to receiving special consideration at the vendor, consumers may earn rebate dollars for using the credit card, as well as, for example, 10% off of future purchases at the vendor (e.g., parts and/or service at the new automobile dealership). The rebate dollars (which may be capped at some maximum amount) are then applied toward the purchase of a product from the vendor (e.g., the purchase or lease of another new or used vehicle) if the rebate dollars are used within a certain predefined timeframe (e.g., 4 years) from the time the reward is earned.

To disperse the financial burden of the rewards program, the various entities in the financial system preferably share the burden of rewards redemption in a "tiered" approach. For example, the vendor may be responsible for an initial portion of the rewards dollars, while the credit card issuer (or even the intermediary) may be responsible for additional portions of the rewards dollars. In this way, one entity may have an initial (and more onerous) burden, while the other entities can delay having to put up capital for the rewards programs until later in the process (after the user has earned a certain amount of reward dollars sponsored by the vendor).

The vendor-sponsored membership plan, as opposed to the credit card, is designed to fill in the gap for those consumers who do not qualify for the credit card. The membership card is designed to allow the consumer to receive many of the benefits of the credit card and to help the vendor retain the consumer as a repeat customer. The membership card is preferably branded and designed to look like the vendor-sponsored credit card 400 (see, FIG. 4), but it will not have the credit card (or credit card issuer's) logo or credit card identifier 440. The membership card may come with an initial rebate toward future purchases from the vendor. For example, the purchase or lease of a new or used vehicle from an automobile dealership as long as the vehicle is purchased from the same dealership within a specified amount of time.

The above dual card system provides a vendor with local area brand recognition and increased customer retention which generates increased short term and long term profits for the vendor. The customer benefits from the well-defined value proposition. The intermediary and the credit card issuer benefit from the revenue stream from interest on the card debt.

As briefly described above, the rewards system is preferably tiered so that part of the redemption burden can be shifted between each of the entities of the system. For example, for the first $1,999 of consumer purchases, 3% (up to $250) of the purchases may be returned to the user as rewards dollars to be spent on the sponsoring dealership. For the next $1,999, the dealer may provide 2% in rewards points. Thereafter, once the customer has maximized the rewards from the dealer, the sponsoring bank may then provide cash-back or other rewards on, for example, 1% of future purchases. Again, the total amount of rewards may be capped at, for example, $750. In this way, the burden of the rewards program may be shared between various sponsoring entities.

The above discussion describes the general structure and features of a multi-party financial system according to the present invention, using an automobile dealership as a preferred example. Below, a more concrete discussion of the system architecture is provided along with an exemplary process by which the system may be utilized.

Figure 3:
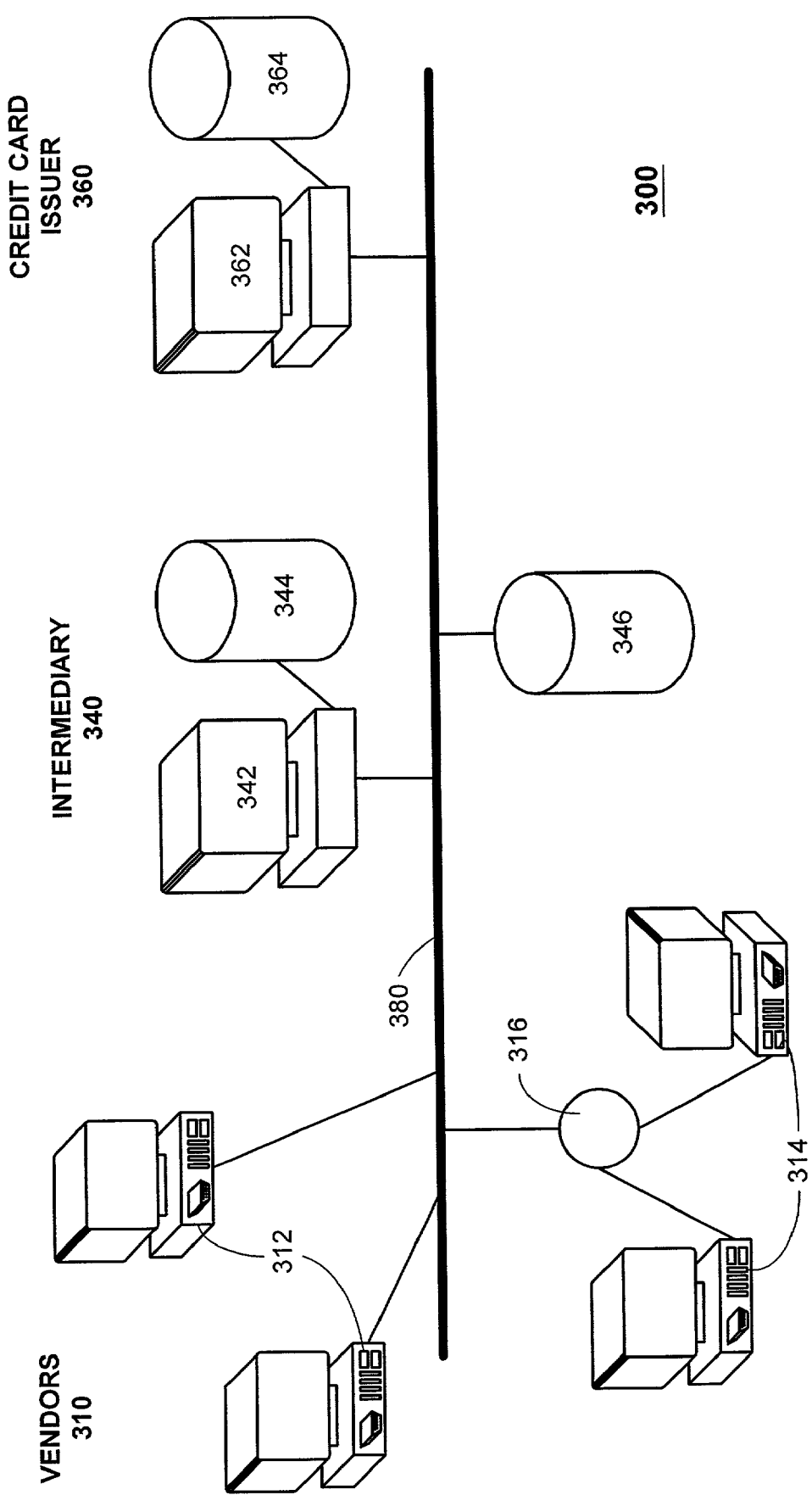
FIG. 3 shows an exemplary system diagram of the present invention.

FIG. 3 shows a general system diagram 300 according to one embodiment of the present invention wherein a plurality of vendors 320 access one or more credit card issuers 360 through an intermediary 340. All communications are facilitated by the Internet 380. Although in FIG. 3, different vendor groups (e.g., different dealership groups) all access the intermediary 340 through the Internet 380 (through an intermediary portal web site), other communication schemes, including various direct connections could also be used within the scope of the present invention.

The vendors 320 are shown as three distinct groups. The first two vendor computers 312 are shown directly connected to the broad bandwidth communications medium 380. These vendor computers 312 may represent the financing manager's computer at two completely different companies, or they may represent two uniquely identifiable computers at the same company, in one or more physical locations. The second two vendor computers 314 are connected to each other and to the Internet 380 via a local area network 316. These computers may be two different machines located at the same vendor location, or the local area network 316 may represent an inter-office connection. An almost limitless variety of architectures may be facilitated by the present invention.

The intermediary 340 is also connected to the broad bandwidth communications medium such as the Internet 380. The intermediary 340 preferably includes one or more computers or servers 342 that are connected to one or more databases 344, 346 that store information pertaining to the financial system. In FIG. 3, database 344 is shown directly connected to the intermediary computer 342 and database 346 may be remotely accessed by the intermediary computer 342. The vendors 320 preferably communicate with the intermediary (and the credit card issuers) using a web browser to access a portal web site run by the intermediary over the Internet 380.

One or more credit card issuers (one shown) 360 are also communicatively connected to the other system users. The credit card issuers 360 include a computer or server 362 and one or more databases 364 to store user information. These components 362, 364 represent all of the functionality that a credit card issuer 360 typically utilizes to manage a credit card system.

Figure 2:
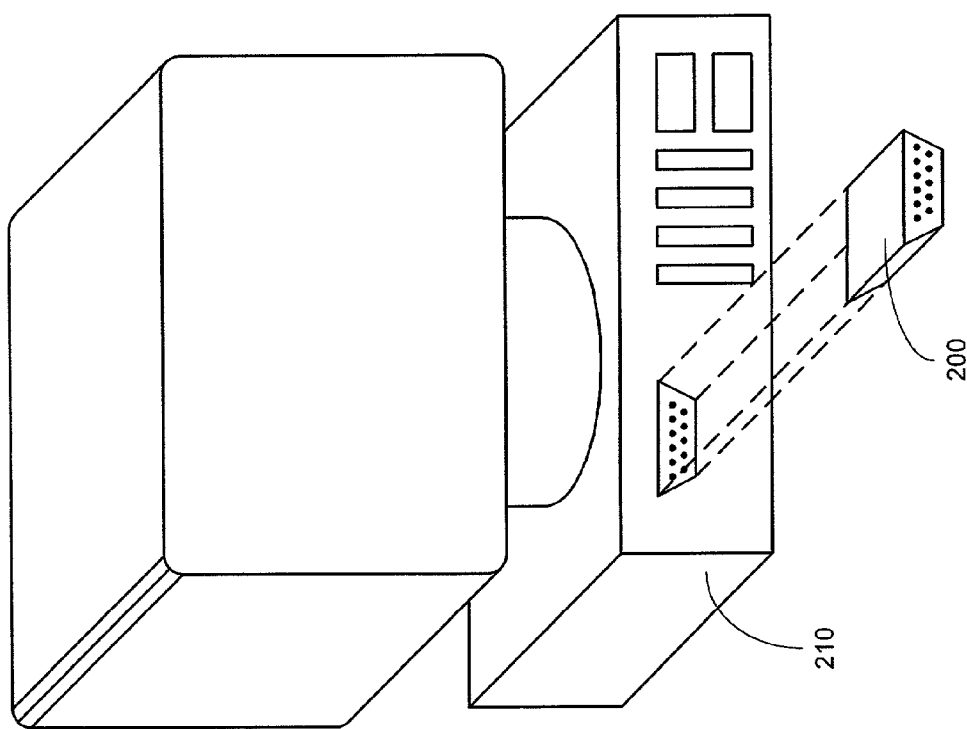
FIG. 2 depicts a personal computer with a hardware HASP applied to an external parallel port.

The present invention preferably uses a hardware or software HASP (Hardware Against Software Piracy) key to uniquely identify all of the users of the system to the intermediary and the bank, so that the activities of each user may be centrally controlled and managed by the intermediary. As seen in FIG. 2, the hardware HASP 200 plugs into the parallel port on rear of the vendor computer 210 (e.g., a personal computer or workstation at the dealership). The software HASP is installed onto the specified, authorized vendor computer 210 at the vendor site. The hardware HASP 200 has 128 bit SSL encryption and allows a first tier of security for users of the system.

As seen in FIG. 3, a vendor computer 312, 314 attempts to access the system 300 by entering a URL (uniform resource locator) of an intermediary portal web site into a web browser on the vendor's computer. The computer 312, 314 may be connected to the Internet 380 in any of a variety of ways, including: a dial-up modem connection, a broadband access, access through a local area network via a network card, or any other method. In a preferred embodiment, the HASP 200 and the software are configured such that, after being presented with an initial "splash page" on the intermediary portal web site, the vendor computer is unable to reach the system login screen unless properly authorized by the system based on the HASP.

The HASP key 200 identifies the vendor, vendor location, department, and even exact computer on which the HASP is installed and present. This unique identification is important to determine if the customer is in the finance, insurance, or parts and service department. The HASP device 200 is preferably an off-the-shelf copy protection device, but it is being used for an identification purpose in this system.

More specifically, the present invention identifies each computer that uses the system by using a hardware identification system, such as the HASP key manufactured by ALADDIN. A HASP is a hardware-based software protection system or software-based software protection system that prevents unauthorized use of software applications. The physical HASP key is a small hardware device (sometimes called a "dongle") that connects to a computer and protects software applications against piracy by preventing use of the software if the key is not present. The software HASP key is a software program that is physically installed onto the user's computer and protects software applications against piracy by preventing use of the software if the key is not present.

A physical HASP may include a custom ASIC (Application Specific Integrated Circuit) chip, a microcontroller, and/or other hardware to perform the anti-piracy functionality. The HASP also includes a memory, such as a one-time programmable Flash ROM that is modified to uniquely identify the computer on which it is to be installed. For example, before installation in a vendor computer, the memory in the hardware HASP is stored with a unique HASP identifier code that is encrypted and can not be altered. After the HASP is installed in the parallel port of the vendor computer, the system software installation is loaded on the vendor computer. The first time this vendor computer system accesses the intermediary web site, the software uploads both the HASP identifier and a hard disk drive serial number (or other vendor computer identifier) to the intermediary system. This HASP/disk identifier combination is used to uniquely identify the location, department, vendor name and other information of the vendor computer. If the HASP is removed and inserted into another computer, or if a different HASP is used with the vendor computer, the HASP/disk combination identifier will not be correct as determined by the initial installation, and the user will not be able to access to the financial system of the present invention.

The following example of purchasing a vendor product will be used to explain the invention. Assume a customer is at an automobile dealer and has selected a car for purchase. The dealer and the customer preferably agree on all of the terms for the car, and an agreement is made between the customer and the dealer for the dealer to purchase an automobile.

Continuing the example, during the financing discussion, the dealer then preferably offers a dealership-specific credit/membership card that provides rewards for future purchases at the dealership. This rewards program helps the user by providing free goods/services in the future and helps the dealer in establishing loyalty with the customer. If the customer decides to participate in the loyalty program, which includes both a credit card rewards program and a membership rewards program, the customer preferably fills out an application at the dealership, which is both an application to become a member of the rewards program and a credit card application.

The customer signs a paper form of the application which is then given to a vendor employee. In the automobile dealership example, the application could be given to an authorized financing employee or other individual at the dealership. The employee uses a vendor computer and a web browser to log onto the intermediary portal web site to obtain credit decisioning either instantly of within 10–14 days. The dealer employee will preferably log onto the intermediary web site and enter all of the relevant information for the customer to apply for a credit card. Preferably, the HASP is used to uniquely identify the dealership, and even the specific location within the dealership, that is currently applying for the card by determining whether the HASP identifier and the vendor computer disk drive serial number match the stored disk/HASP identifier in the intermediary system database. Without the proper HASP identifier, the web site is not accessible by this vendor computer. With the HASP, the relevant information can be uploaded to the intermediary site.

Once a secure communications link, which may include 128 bit encryption of the information as well as identification of the sender, is established between the vendor computer and the intermediary portal web site (after the vendor is verified), the intermediary system allows an operator at the intermediary to enter a new application or to recall an application that is currently pending. Thereafter, the intermediary operator may enter the information into the intermediary "Credit Card Acquisition System" (CCAS), and the information can be stored in an intermediary database and/or the process may continue. After storage, the operator preferably selects a "Visa" button or other selection mechanism to send the application request to a credit card issuer. For example, selecting the Visa button may open an HTML framed page of a web site administered by the credit card issuer. Then, the intermediary system may transfer the application information in a format that can be read and interpreted by the credit card issuer web-based system. For example, the information may be posted into a CGI bin at the credit card issuer. The credit card issuer preferably takes control of the credit card application at that point in time.

The system 300 may provide for more than one possible credit card or other membership card that may be procured by the user. For example, if the customer does not get approved for a credit card by the credit card issuer, the intermediary may offer a non-credit card rewards membership card that may be used by the customer. The intermediary 340, which has the stored application information on its system, may wait a predefined period of time (e.g., one week) to see if the credit card issuer issues a credit card to the customer. If no card is issued in this time frame, the application information may be flagged to issue an intermediary "membership card" to the customer. The membership card preferably has certain attributes of the system credit card, but does not have the spending power of the credit card. The card may only be able to be used at the sponsoring vendor. In this way, the customer's ill feelings for not being approved for the full credit card may be mitigated to some degree.

If the credit card issuer 360 approves the credit card application, notification of the acceptance of the application is preferably sent back to the intermediary system 340 either instantly (within thirty seconds) or within 10–14 days. In short, the intermediary 340 manages the relationship between the vendor 320 and the credit card issuer 360. The intermediary 340 periodically sends a report listing all of the customers who are enrolled in the membership program and/or have successfully obtained a vendor-sponsored credit card. For example, a paper or electronic report may be sent to each dealer on a monthly basis, but that information is also preferably accessible on-line from a web page controlled by the intermediary. Again, information about a certain customer is preferably only accessible from a computer with a HASP identifier that corresponds to the vendor that sponsored the card for the customer.

The present invention includes the ability to obtain on-line instant approval for the vendor-sponsored credit card. Once the authorized vendor employee (or other authorized vendor representative) enters the electronic application to the intermediary URL site and the intermediary 340 forwards the information to the credit card issuer 360, the credit card issuer may provide an on-line instant approval for the application. The credit card issuer 360 then sends an account number and an approved spending limit for the credit card to the intermediary 340 through to it's vendor site 320 for those applications that receive instant on-line credit decisioning. The initial spending limit may be from about $1,000 to $10,000. The customer is then able to spend up to this approved limit instantly. The vendor representative preferably provides a brochure that includes all of the disclosure forms and other legally mandated forms, but the customer is then able to use this "credit card" in a "card not present" transaction.

Figure 4:
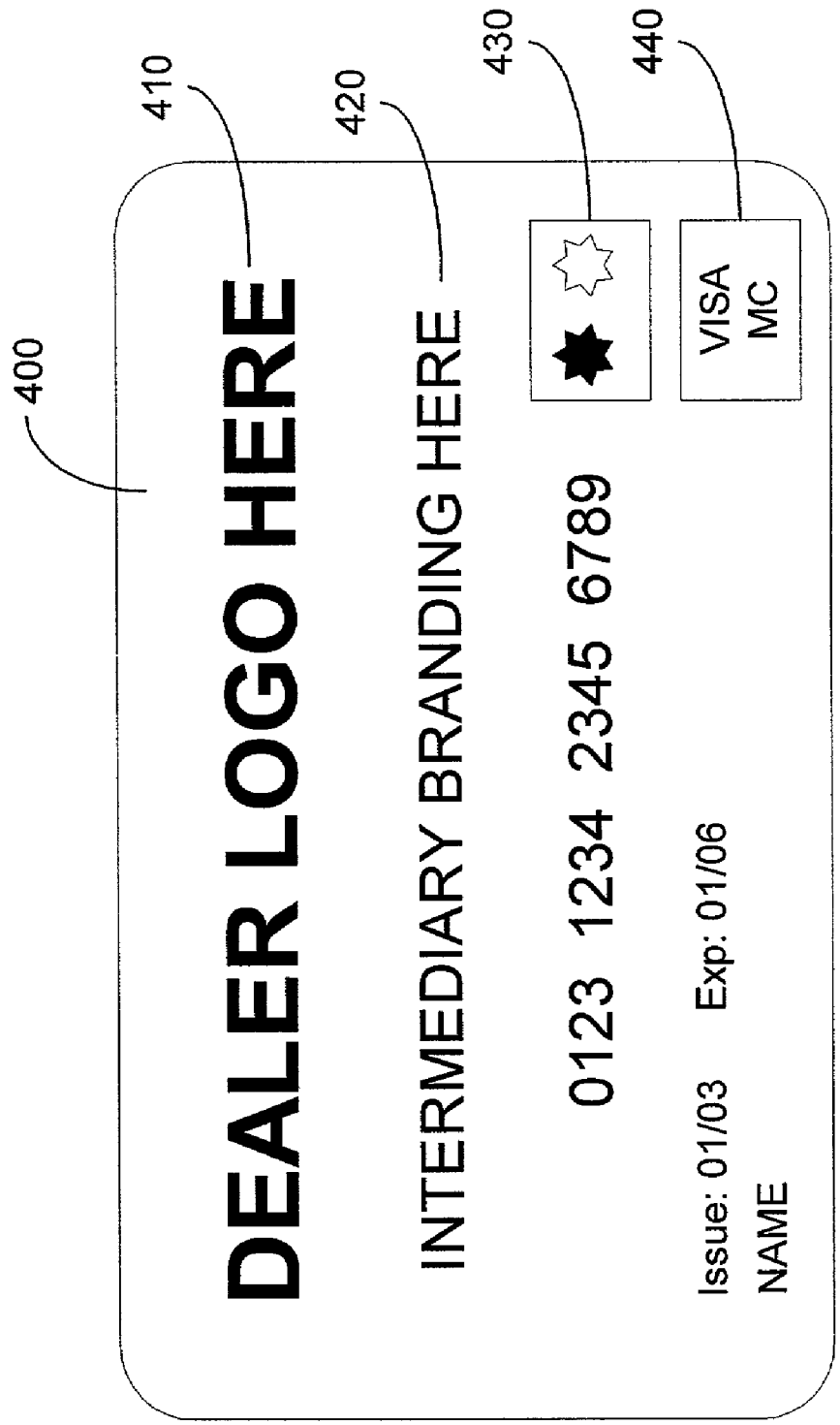
FIG. 4 depicts an exemplary vendor branded credit card for use with the present invention.

The credit card issuer will then mail the actual credit card to the vendor's customer (applicant) in due course (typically 7–10 working days). As shown in FIG. 4 and briefly described above, the credit card 400 includes prominent vendor branding 410, optional intermediary or card issuer branding 420, a credit card authentication marking (hologram) 430, and an indication of the type of card (e.g., VISA or MASTERCARD) 440. A rewards card may look the same as the FIG. 4 credit card 400 with the absence of the credit card indicator 440. The correct vendor logo is automatically associated with an applicant based on the identification information facilitated by the HASP. The intermediary site may, in fact, store all of the logo images on its site and send the image to the credit card issuer.

The present invention preferably facilitates the communication between any industry that needs to connect to any banking or credit card issuing system. Each and every client to the system may be uniquely identified using the HASP, and data encryption and security is maximized. Also, the intermediary takes care of any data conversion and other potential communications problems by accepting the application and other information from the vendor and converting the data to a form expected by the credit card issuer. If any credit card issuer, bank or other financial information provides the technical details on how and where information is expected (e.g., for an on-line instant approval), the intermediary can be tailored to facilitate transactions to that financial system. For example, the instructions may be to go to a certain CGI bin and provide a certain type of information in a certain format.

One of the benefits of the present invention is that the intermediary can aggregate many vendors under a single program. For example, beyond car dealerships, the system could also aggregate all retail stores of a single brand or any other grouping of vendors, and each of these multiple vendors can be uniquely identified at all times utilizing the HASP.

The bank can then easily determine at what time a transaction is entered, who entered it, from what store and at what terminal it was entered, and at what department the transaction was entered from.

The intermediary may bring together disparate organizations, different vendors who are not affiliated with one another, under the intermediary umbrella as a distribution channel to get credit cards. The intermediary's brand name may be branded on the cards along with the individual vendor's name or logo. Therefore, each individual vendor is uniquely identified and dealt with, but an overall group structure is enabled.

The present invention may also include a unique redemption process that is accessible by the individual vendors. The vendors are able to go on-line to the intermediary's business-to-business (B2B) web site and view all of the transaction information about members in their program. As the vendor sees activity in a user's account, the vendor may be able to more effectively target advertising to that individual customer. For example, as the customer approaches various levels of redemption points, they may be encouraged to come to the vendor and spend the points. This keeps the vendor's branding in the customer's focus. Again, this access is based on HASP identification.

For example, an automobile dealer may view the redemption files and determine which users have over $500 in outstanding program redemption points. Thereafter, a year-end sales promotion may be combined with this information to target those membership customers who can most take advantage of the sales promotion. Typically, the reward dollars will only be able to be used for new or used car purchases. The dealers may also give other "rewards" to customers who use their dealer-sponsored credit card at the dealership. For example, an additional 5% or 10% discount may be given at a dealership for purchases using the card (again, to enhance loyalty). Traditional programs may not allow for the use of such points against used car purchases.

The intermediary preferably also has the ability to customize rewards on a vendor by vendor basis. For example, the intermediary may have a standard template of benefits that are provided. One set of benefits may be for the full credit card, and one set of benefits may be for the membership card. Other discounts, offers, or benefits may be provided by the vendor to the program members. For example, at an automobile dealership, the dealer may opt not to have a discount and instead have a program whereby for every dollar that the customer spends at the dealership in the service area, the dealer returns 10% in "loyalty dollars." If the customer spends $100, $10 in rebates on future service at the dealership may be returned.

In summary, a preferred method for utilizing the present invention is as follows. A vendor PC workstation (with HASP) is connected to the World Wide Web via a web browser. The splash page on the intermediary portal web site forces 128-bit SSL encryption which precludes password or other sensitive information from being intercepted. At the URL splash page, the authorized vendor employee then proceeds to the login page which will only appear if the vendor's PC has a valid hardware HASP device physically installed. The HASP device sends 128-bit information to the credit card acquisition system security database web server which checks to see if the HASP is valid and, if so, will then present a user login page.

The authorized vendor employee enters their login name and their password, and the security database checks to see if the employee can be logged into that PC at the present time. If the login and time are valid, the employee is presented with a credit card application URL, and the employee then fills in all necessary credit card application information. The employee clicks to submit the application to the bank for a Visa credit card or is allowed to present the customer the membership program. If Visa was selected then the system transfers the credit information to the bank by posting to a CGI bin. The bank then processes the application and may approve the application instantly with an account number and an approval credit amount. If the application is not approved instantly, the bank sends the message that it is currently processing the application.

Nothing in the above description is meant to limit the present invention to any specific materials, geometry, or orientation of parts. Many part/orientation substitutions are contemplated within the scope of the present invention. The embodiments described herein were presented by way of example only and should not be used to limit the scope of the invention.

Although the invention has been described in terms of particular embodiments in an application, one of ordinary skill in the art, in light of the teachings herein, can generate additional embodiments and modifications without departing from the spirit of, or exceeding the scope of, the claimed invention. Accordingly, it is understood that the drawings and the descriptions herein are proffered by way of example only to facilitate comprehension of the invention and should not be construed to limit the scope thereof.

What is claimed is:

1. A multi-party financial system, comprising: at least one vendor computer including the ability to uniquely identify itself in an electronic communication; a credit card issuer computer; a broad bandwidth communications medium; and an intermediary computer communicatively connected to said at least one vendor computer and said credit card issuer computer via said communications medium, wherein said intermediary computer receives credit card application information from a uniquely identified vendor computer and transmits that information to a credit card issuer, further wherein the capability for the vendor computer to uniquely identify itself to the intermediary computer is in the form of a hardware component connected to a parallel port of each of said plurality of vendor computers, and further wherein said hardware component is a hardware HASP (Hardware Against Software Piracy) that includes a unique HASP identification code and said hardware HASP is uniquely and permanently associated with said vendor computer at installation and cannot be moved to another vendor computer after installation.

2. The multi-party financial system of claim 1, wherein said HASP identification code and a hard disk drive serial number of the vendor computer on which the HASP is installed is used to uniquely identify the vendor computer to the intermediary.

3. The multi-party financial system of claim 1, wherein said intermediary computer includes a business-to-business web site in which each vendor computer may access information about its customers.

4. The multi-party financial system of claim 1, wherein said intermediary computer periodically sends reports to each of send vendor computers about each vendor's customers spending habits.

5. The multi-party financial system of claim 1, wherein said credit card issuer computer is adapted to provide instant credit card application decisions to the vendor computer.

6. The multi-party financial system of claim 1, wherein said credit card issuer computer includes a CGI bin in which said credit card application information may be sent by the intermediary.

7. A method for using a multi-party financial system comprising the steps of: providing at least one vendor computer including the ability to uniquely identify itself in an electronic communication; providing a credit card issuer computer; providing a broad bandwidth communications medium; and providing an intermediary computer communicatively connected to said at least one vendor computer and said credit card issuer computer via said communications medium; receiving, at said intermediary computer, credit card application information from a uniquely identified vendor computer; and transmitting said credit card application information to a credit card issuer, wherein the capability for the vendor computer to uniquely identify itself to the intermediary computer is in the form of a hardware component connected to a parallel port of each of said plurality of vendor computers, and further wherein said hardware component is a hardware HASP (Hardware Against Software Piracy) that includes a genuine HASP identification code and said hardware HASP is uniquely and permanently associated with said vendor computer at installation and cannot be moved to another vendor computer after installation.

8. The method of claim 7, wherein said HASP identification code and a hard disk drive serial number of the vendor computer on which the HASP is installed is used to uniquely identify the vendor computer to the intermediary.

9. The method of claim 7, wherein said intermediary computer includes a business-to-business web site in which each vendor computer may access information about its customers.

10. The method of claim 7, wherein said intermediary computer periodically sends reports to each of send vendor computers about each vendor's customers spending habits.

11. The method of claim 7, wherein said credit card issuer computer is adapted to provide instant credit card application decisions to the vendor computer.

12. The method of claim 7, wherein said credit card issuer computer includes a CGI bin in which said credit card application information may be sent by the intermediary.

* * * * *